June 4, 1929.  C. A. MULLER  1,716,278
INTERNAL COMBUSTION ENGINE AND METHOD OF SUPPLYING IT WITH AIR
Filed Sept. 27, 1926
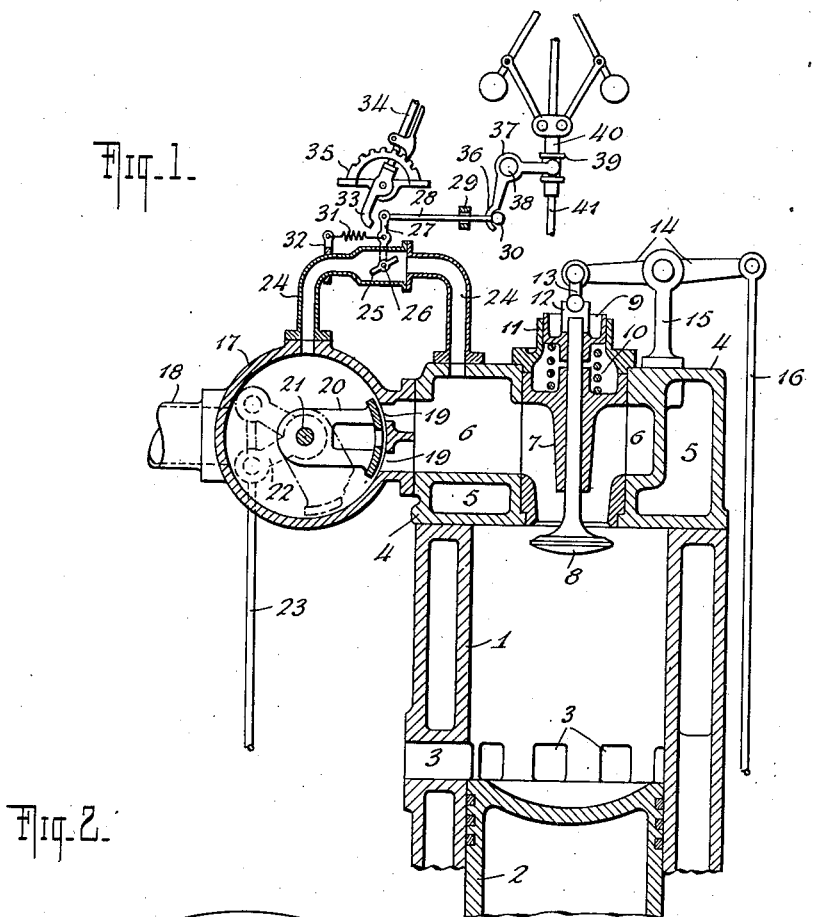
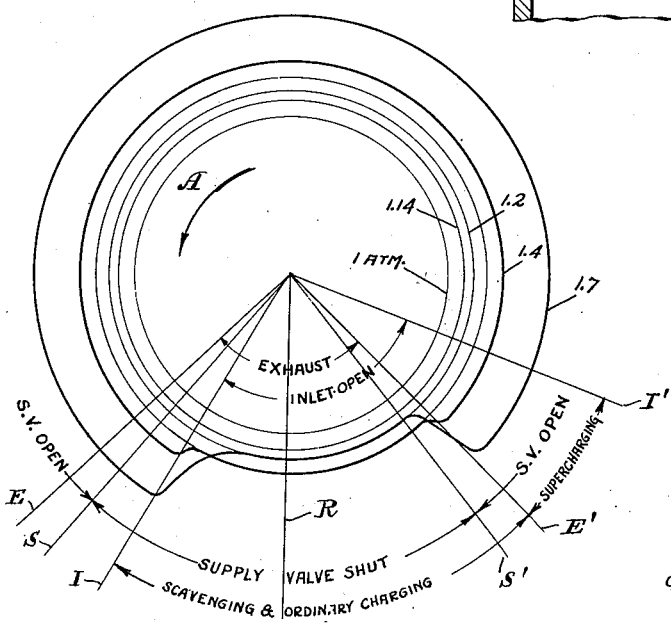
INVENTOR
CHARLES A. MULLER
BY
ATTORNEYS Patented June 4, 1929.

1,716,278

UNITED STATES PATENT OFFICE.

CHARLES A. MULLER, OF BROOKLYN, NEW YORK.

INTERNAL-COMBUSTION ENGINE AND METHOD OF SUPPLYING IT WITH AIR.

Application filed September 27, 1926. Serial No. 137,839.

This invention is more especially applicable to internal combustion engines and its object is to increase the power developed by such engines and their economy, at the same time simplifying their construction to reduce their initial and maintenance costs.

To increase the power it has become customary to increase the weight of air and fuel to be trapped within a given power cylinder and where air alone is precompressed in said cylinder it is customary to increase the initial pressure of compression by the introduction of compressed air into the cylinder after all other supply or discharge valves and ports have been closed.

In engines of the two stroke cycle type a certain amount of air is used for sweeping the cylinder clean of products of combustion providing thereby a fresh charge of air, and when the exhaust ports or valves are closed more air from the same source at the same pressure is introduced to increase the initial pressure before compression.

In order to produce an appreciable supercharge of the power cylinder this extra supply of air must be continued for an appreciable period and when this is done during the compression stroke in the power cylinder the pressure of the air supply, which is also the scavenging pressure, must be raised and the sweeping of the cylinder becomes inefficient and wasteful of compressed air, necessitating larger air pumps which in turn subtract more power from the available output of the engine. During the scavenging period the air speed at the ports or valves is so great as to create a fluctuation in the air supply and when the supercharging period begins the pressure is low instead of normal so that the efficiency of the supercharge is impaired. My invention obviates the drawbacks above set forth while maintaining all the advantages of a single pressure supply for scavenging and supercharging; it also provides an efficient and variable control of pressures so that a low pressure may be obtained at the charging or scavenging valve during the scavenging period without wire drawing at the air inlet into the power cylinder and so that a higher pressure may prevail during the supercharging period.

My invention also consists in using this control of scavenging and supercharging pressure to change the pressure of the air supply thus lightening the work of the air compressors or blowers as the supercharging pressure is lowered when the engine has a relatively light load to carry. This causes the fuel consumption necessary to drive said compressors or blowers to drop together with the reduction of fuel consumption due to the reduced power output of the engine and results in better fuel economy at light loads than heretofore obtained.

In the accompanying drawings, Fig. 1 is a somewhat diagrammatic section of a two-stroke cycle engine embodying my present improvements, and Fig. 2 is a diagram illustrating certain features of the operation.

In Fig. 1, I have shown an engine cylinder 1 with a piston 2 which drives the main engine crankshaft in any well-known or approved manner (not shown). This piston is shown at the bottom or end of its outward stroke, fully uncovering the exhaust ports 3 of cylinder 1. A cylinder cover 4 is fastened to cylinder 1 by usual bolting (not shown) and has a water cooling jacket 5 and an air chamber 6 in which the valve cage 7 and inlet valve 8 are located. The valve 8 is provided with the usual closing spring 10 bearing against a collar 9 fastened to the stem of said valve. Collar 9 slides in an auxiliary guide 11 fastened to cylinder cover 4 by bolts (not shown) and holding valve cage 7 down in position.

The nut 12 screwing on the end of the stem of valve 8 has a socket receiving one end of the link 13 which is part of a conventional valve driving mechanism represented by lever 14, support 15, and rod 16, with usual bearings and pins. The rod 16 is driven in any suitable manner, for instance by cams or eccentrics and indirect connections not shown, from the motive piston 2 and its crankshaft.

A drum shaped casing 17 receives a supply of compressed air by pipe 18 from a source not shown and communicates with an air chamber 6 of cylinder cover 4 by the openings or ports 19. A valve or shutter 20 is fastened on fulcrum shaft 21 supported by and pivoted in, the closed ends of casing 17. Lever 22 is fastened to an outside extension of shaft 21 and is driven by rod 23 which is positively operated by cams, eccentrics or other elements suitably connected to moving parts (not shown) driven by piston 2. A pipe or channel 24 forms an additional air duct between casing 17 and air chamber 6, and is placed outside the range of action of shutter 20 constituting an air supply valve. A butterfly valve 25 is pivoted at 26, its pivot pin extending outside the channel 24 to a connection with a control lever 27. This lever is articulated to a rod 28 sliding in the support 29 and having a cross pin 30 at its free end. A tension spring 31 held at one end by bracket 32 pulls lever 27 and rod 28 bringing said rod in contact with either one of two stops 33 and 36. The position of stop 33 is regulated by hand lever 34 maintained at rest by the stationary notched quadrant 35. The position of stop 36 is regulated by bellcrank 37 pivoted on a fixed fulcrum 38 and slidably engaged between the collars 39 of a speed governor sleeve 40 mounted on driving shaft 41. The governor may be a conical pendulum governor of any well known type so arranged as to move the sleeve 40 upward when the engine speed increases and downward when the speed decreases.

Fig. 2 is a circular diagram, the radial lines denoting the position of the engine crank, the complete circle representing one revolution of said crank, and the angles between radial lines representing the approximate fractions of said revolution during which the mechanically operated valves and ports may happen to be opened or closed. The concentric circular lines denote air pressures in the chamber 6, the inside line is by way of comparison one atmosphere absolute, the outside lines denoting increased pressures, and without limiting myself to the figures given but for the purpose of clearly disclosing my invention I have shown the several circular pressure lines as indicating respectively 1.14, 1.2, 1.4 and 1.7 atmospheres absolute.

The operation is as follows:

Following the rotation of the engine crank in the direction of the arrow A, Fig. 2, when during the downstroke of the piston the crank reaches the radial line E, the piston begins to open the exhaust ports 3; the shutter 20 is brought in registry with the ports 19 (position shown in Fig. 1) when or before the crank reaches radial line S Fig. 2. When the crank reaches the position I the valve 8 begins to open and the air contained in chamber 6 expands into the power cylinder 1, blowing into the top of said cylinder with an initial pressure of say 1.7 atmosphere and preventing combustion gases from flaring back into chamber 6 until the pressure of said gases has subsided due to the continued opening of the exhaust ports 3 by piston 1. The high velocity of the gases and air would cause the pressure in chamber 6 to drop rapidly from say 1.7 atmosphere to nearly one atmosphere but for the fact that the butterfly valve 25 when kept partially open admits enough supply air into chamber 6 to maintain a pressure of say 1.2 atmosphere within said chamber while the crank moves between positions I and S'. The radial line R indicates the crank position corresponding to the lowermost position of the piston, which is the position shown in Fig. 1. During this period the inlet valve 8 is opened in full and the cylinder is fed from chamber 6 with air at say 1.2 atmosphere said air at that time scavenging the cylinder at a pressure below that which is maintained at say 1.7 atmosphere in the air supply pipe 18 and drum 17. A certain expansion therefore takes place within channel 24 and at its point of discharge into chamber 6; an important fact is that such expansion does not take place within valve cage 7 at or near the seat of valve 8. At position S' of the crank the shutter valve 20 uncovers the ports 19 giving the air supply in drum 17 free access to air chamber 6, in which chamber the pressure quickly rises to the supply pressure of say 1.7 atmosphere as the crank reaches its position E'. At this point the exhaust ports 3 are closed entirely by the piston 2, and therefore scavenging and ordinary charging ceases. The inlet valve 8 remaining open delivers supercharging air under a pressure of say 1.7 atmosphere to the cylinder until the crank reaches position I' when inlet valve 8 closes. As the crank continues its upward stroke, the piston compresses the air in the cylinder and near the top of this stroke fuel is injected into the remaining cylinder clearance through a fuel valve (not shown), and then explosion or ignition takes place, the engine going through the well known cycle of its operation until the crank again reaches position E, on its downward stroke. During this period I' to E, the valve 8 has remained closed, cutting off cylinder 1 from air chamber 6. At the beginning of the same period the shutter 20 cleared ports 19 which may remain fully open or may register with the shutter 20 at any time during said period; it is important however that shutter 20 should again register with the ports 19 some little time before the crank reaches position I.

The effect produced by changing the position of the butterfly valve 25 from partially open to full open will be to increase the pressure prevailing in the air chamber 6 during the interval I S' from say 1.2 atmosphere to a higher pressure, causing a greater quantity of air to sweep the engine cylinder, therefore draining the air supply and dropping its pressure from say 1.7 to 1.4 atmosphere. This action lightens the work of the air supply pumps and diminishes the difference existing between scavenging and supercharging pressures.

Changing again the position of the butterfly valve 25 to shut off any passage of air in channel 24 would drop the pressure prevailing in the air chamber 6 during the interval I S' to the pressure of the cylinder 1 which would then be lacking in scavenging air. My invention provides against such contingency by leaving a certain space or clearance between the outer surfaces of the vanes of shutter 20 and the cylindrical bore of the drum 17 so that there is no contact between same and even when the shutter 20 is covering the ports 19, this space allows a certain amount of air to be by-passed directly from the drum 17 into the air chamber 6. In practice the space is so proportioned that cylinder 1 will aways be scavenged with a minimum pressure of for example 1.14 atmosphere when the butterfly valve is closed, in which case the supercharging and supply pressures would rise to say above 1.7 atmosphere. The difference between scavenging and supercharging pressure is therefore greater when the butterfly valve 25 is closed than when it is open. When the engine load increases and the speed drops the governor sleeve 40 moves downward causing the stop 36 to move toward the left. The rod 28 and lever 27 follow in the same direction by the action of the spring 31, and the butterfly valve 25 checks somewhat the passage of air in channel 24; the scavenging pressure drops but the supercharging pressure increases and a greater weight of air is trapped in the cylinder in which the customary variation in the amount of injected fuel is made in the conventional manner to adapt the power output to the increased load. The maximum permissible difference between the lower scavenging pressure and the higher supercharging pressure can be limited by the position of stop 33 as set by the hand lever 34 on notched quadrant 35. This hand adjustment throws the speed governor out of action whenever lever 27 or rod 28 comes in contact with stop 33 and as the governor speed, and sleeve 40, continue to drop the stop 29 disengages itself from the cross pin 30 of rod 28.

When the engine load drops and the speed increases the governor sleeve moves upward causing the stop 36 to move toward the right, to engage and carry along the rod 28, lever 27 and butterfly valve 25 which opens up the passage of air in channel 24. Due to the resultant drop in supercharging pressure a lesser weight of air is trapped in the cylinder in which as usual a lesser amount of fuel is injected.

Various modifications may be made without departing from the nature of my invention as set forth in the appended claims.

I claim:

1. The method of supplying the power cylinder of an internal combustion engine with air for scavenging and for the combustion charge, which consists in introducing air into the cylinder from a single supply of air adjacent to said cylinder and under an initial pressure after the exhaust is open, then continuing the supply of air under a reduced pressure while the exhaust is still open, and thereupon introducing a further amount of air into the cylinder under said higher initial pressure, while the exhaust is closed.

2. In an internal combustion engine, a power cylinder, an air supply connection leading to said cylinder, a valve controlling the passage of air from said connection to the cylinder, and another valve, governed by the engine, and controlling the passage of air through said connection to the first-mentioned valve, said other valve being constructed and arranged so that the admission of air to said chamber is never completely interrupted and the operation of said valves being so timed as to cause the pressure of the air in that part of said connection which lies between the two valves to be first lowered and then raised.

3. In an internal combustion engine, a power cylinder, means to supply a charge of air under pressure to said cylinder, and additional means whereby, during each admission, the pressure of such air will be first lowered to a substantially constant amount and then raised at the end of the air transmission.

4. In an internal combustion engine, a power cylinder having exhaust ports and a power piston controlling them, an air chamber adjacent to said cylinder, means for admitting air under pressure from said chamber to the cylinder, and means for maintaining a lower constant pressure in said chamber during each of the air admissions controlled by the first-mentioned means.

5. In an internal combustion engine, a power cylinder, an air chamber adjacent to said cylinder, a valve controlling the admission of air from said chamber to said cylinder, an air supply casing having a delivery port connecting it with said chamber, and a valve operated by the engine and movable into and out of registry with said port, but leaving at all times a clearance of fixed size to form a permanently open connection from said casing to said chamber.

6. In an internal combustion engine, a power cylinder, an air chamber adjacent to said cylinder, a valve controlling the admission of air from said chamber to the cylinder, an air supply casing having a permanently open connection of fixed cross sectional area leading to said chamber and an additional connection leading to said chamber, and movable means controlling said additional connection.

7. In an internal combustion engine, a power cylinder, an air chamber adjacent to said cylinder, a valve controlling the admission of air from said chamber to said cylinder, an air supply casing having a delivery port connecting it with said chamber and a valve operated by the engine and movable into and out of registry with said port, but leaving at all times a clearance of fixed size to form a permanently open connection from said casing to said chamber, an additional connection from said casing to said chamber, and a governor controlled valve in said additional connection.

8. In an internal combustion engine, a power cylinder, an air chamber adjacent to said cylinder, a valve controlling the admission of air from said chamber to the cylinder, and a valve timed by the engine and permitting the entry of a continuous uninterrupted supply of air to said chamber while regulating the air flow to vary the pressure therein at definite periods of the operation.

9. In an internal combustion engine, a power cylinder, an air chamber adjacent to said cylinder, a valve controlling the admission of air from said chamber to the cylinder, and a valve timed by the engine and regulating the supply of air to said chamber to vary the pressure therein at definite periods of the operation, another valve controlling the passage of air to said chamber, and a governor regulating the action of said last-named valve in accordance with the engine speed.

10. In an internal combustion engine, a power cylinder, an air chamber adjacent to said cylinder, a valve controlling the admission of air from said chamber to the cylinder, and a governor controlled valve for varying the supply of air to said chamber in accordance with changes in the engine speed.

11. In an internal combustion engine, a power cylinder, an air chamber adjacent to said cylinder, a valve controlling the admission of air from said chamber to said cylinder, an air supply casing for delivering air to said chamber, and a valve timed by the engine and permitting a continuous passage of air from said casing to said chamber while regulating the air flow so as to vary the pressure in the chamber at definite periods of the operation.

12. In an internal combustion engine, a power cylinder, an air chamber adjacent to said cylinder, a valve controlling the admission of air from said chamber to said cylinder, an air supply casing for delivering air to said chamber, and a valve timed by the engine and regulating the passage of air from said casing to said chamber to vary the pressure in the chamber at definite periods of the operation, and a governor controlled valve for varying the passage of air from said casing to said chamber in accordance with changes in the engine speed.

13. In an internal combustion engine, a power cylinder, an air chamber adjacent to said cylinder, a valve controlling the admission of air from said chamber to said cylinder, an air supply casing for delivering air to said chamber, and a governor controlled valve for varying the passage of the air from said casing to said chamber in accordance with changes in the engine speed.

14. In an internal combustion engine, a power cylinder having an exhaust and means for closing it periodically, a device controlling the supply of air to said cylinder, and pressure control means to maintain, on the supply side of said device, a relatively high initial pressure when the exhaust is closed and a lower pressure when the exhaust is open.

15. In an internal combustion engine, a power cylinder having an exhaust and means for closing it periodically, a device controlling the supply of air to said cylinder, and pressure control means to maintain, on the supply side of said device, a relatively high initial pressure when the exhaust is closed and a lower pressure when the exhaust is open, said pressure control means being timed by the engine.

16. In an internal combustion engine, a power cylinder having an exhaust and means for closing it periodically, a device controlling the supply of air to said cylinder, and pressure control means to maintain, on the supply side of said device, a relatively high initial pressure when the exhaust is closed and a lower pressure when the exhaust is open, and additional pressure control means, governor-actuated to vary the pressure in accordance with changes in the engine speed.

17. The method of scavenging the power cylinder of an internal combustion engine which consists in maintaining adjacent to said cylinder a supply of air under constant predetermined pressure before and until after the exhaust is open and the pressure in said cylinder had dropped below said predetermined pressure, then admitting air from said air supply into the cylinder while the exhaust remains open, thereby reducing the pressure of said adjacent air supply, and then maintaining such reduced pressure of said adjacent supply constant during substantially the remainder of the scavenging period.

18. The method of scavenging the power cylinder of an internal combustion engine which consists in maintaining adjacent to said cylinder a supply of air under constant predetermined pressure before and until after the exhaust is open and the pressure in said cylinder had dropped below said predetermined pressure, then admitting air from said air supply into the cylinder while the exhaust remains open, thereby reducing the pressure of said adjacent air supply, and then maintaining such reduced pressure of said adjacent supply constant during substantially the remainder of the scavenging period and finally restoring the initial predetermined higher pressure at the end of the scavenging period.

19. The method of scavenging the power cylinder of an internal combustion engine which consists in maintaining adjacent to said cylinder a supply of air under constant predetermined pressure before and until after the exhaust is open and the pressure in said cylinder had dropped below said predetermined pressure, then admitting air from said air supply into the cylinder while the exhaust remains open, thereby reducing the pressure of said adjacent air supply, and then maintaining such reduced pressure of said adjacent supply constant during substantially the remainder of the scavenging period, then restoring the initial predetermined higher pressure at the end of the exhaust period.

20. The method of scavenging the power cylinder of an internal combustion engine which consists in maintaining adjacent to said cylinder a supply of air under constant predetermined pressure before and until after the exhaust is open and the pressure in said cylinder had dropped below said predetermined pressure, then admitting air from said air supply into the cylinder while the exhaust remains open, thereby reducing the pressure of said adjacent air supply, and then maintaining such reduced pressure of said adjacent supply constant during substantially the remainder of the scavenging period, then restoring the initial predetermined higher pressure at the end of the exhaust period and admitting supercharging air under such higher pressure into the cylinder at a time when the exhaust is closed, and maintaining such higher pressure of said supply until the next scavenging and charging period.

21. The method of scavenging and supercharging the power cylinder of a two-stroke cycle internal combustion engine which consists in maintaining to the cylinder a supply of air under a given pressure while the exhaust is closed and until after it has been opened and while such supply is disconnected from the cylinder, then establishing communication between the said air supply and the cylinder while the exhaust remains open thereby allowing air from said supply to pass to said cylinder and permit the supply to expand to a lower pressure, and while the exhaust is closed restoring the pressure of said supply to said given pressure.

22. In an internal combustion engine, a power cylinder having an air inlet port and an exhaust port, means for opening and closing said ports, means for delivering air under pressure to said cylinder through said inlet port, and means operating in timed relationship with said first named means and co-operating therewith, during each air admission to the cylinder to effect at said inlet port the full air pressure at the instant of opening thereof and after the initial opening of the exhaust port, then to throttle the air in its passage to reduce its pressure and to maintain such reduced pressure constant during the remainder of the exhaust port's opening, and finally to restore the full air pressure after the closing of the exhaust port and during the remainder of the air admission.

In testimony whereof I have hereunto set my hand.

CHARLES A. MULLER.